US010975886B2

(12) United States Patent
Asakawa et al.

(10) Patent No.: US 10,975,886 B2
(45) Date of Patent: Apr. 13, 2021

(54) TURBOCHARGER

(71) Applicant: IHI Corporation, Koto-ku (JP)

(72) Inventors: Takao Asakawa, Tokyo (JP); Kenichi Segawa, Tokyo (JP); Takahiro Kobayashi, Tokyo (JP); Ryota Sakisaka, Tokyo (JP); Kazuko Takeuchi, Tokyo (JP); Kenji Bunno, Tokyo (JP)

(73) Assignee: IHI Corporation, Koto-ku (JP)

( * ) Notice: Subject to any disclaimer, the term of this patent is extended or adjusted under 35 U.S.C. 154(b) by 169 days.

(21) Appl. No.: 16/104,315

(22) Filed: Aug. 17, 2018

(65) Prior Publication Data

US 2018/0355889 A1 Dec. 13, 2018

Related U.S. Application Data

(63) Continuation of application No. PCT/JP2017/004919, filed on Feb. 10, 2017.

(30) Foreign Application Priority Data

Mar. 25, 2016 (JP) .............................. JP2016-062106

(51) Int. Cl.
*F04D 29/58* (2006.01)
*F02B 37/24* (2006.01)
(Continued)

(52) U.S. Cl.
CPC .......... *F04D 29/5853* (2013.01); *F02B 37/24* (2013.01); *F02B 39/00* (2013.01);
(Continued)

(58) Field of Classification Search
CPC .... F04D 29/5833; F04D 29/462; F04D 17/10; F02B 39/00; F02B 39/16; F02B 37/14; F02B 2039/164
See application file for complete search history.

(56) References Cited

U.S. PATENT DOCUMENTS 5,028,208 A 7/1991 Mitsubori et al.
2008/0260520 A1* 10/2008 Hettinger .............. F01D 17/165
415/163

(Continued)

FOREIGN PATENT DOCUMENTS

CN 102639838 8/2012
CN 105814279 7/2016
(Continued)

OTHER PUBLICATIONS

International Search Report dated Apr. 25, 2017 in PCT/JP2017/004919, filed on Feb. 10, 2017 (with English Translation).
(Continued)

*Primary Examiner* — David E Sosnowski
*Assistant Examiner* — Danielle M. Christensen
(74) *Attorney, Agent, or Firm* — Oblon, McClelland, Maier & Neustadt, L.L.P.

(57) ABSTRACT

Provided is a turbocharger, including: a turbine impeller (impeller); nozzle vanes provided on a radially outer side of the turbine impeller; a nozzle ring to which the nozzle vanes are provided; a heat-shielding member including: an outer contact portion, which is arranged between a back surface of the turbine impeller and a wall portion of a bearing housing (housing), and is brought into contact with the nozzle ring from a side opposite to the nozzle vanes; and an inner contact portion, which is at a position on an inner side in a radial direction of the shaft with respect to the outer contact portion, and is brought into contact with a wall portion of the bearing housing from the turbine impeller side; and a separation portion, which is formed on the wall portion of the bearing housing, and is recessed toward a side of separating from the heat-shielding member with respect to a contact portion to be brought into contact with the inner contact portion of the heat-shielding member.

11 Claims, 5 Drawing Sheets

(51) Int. Cl.
*F02B 39/00* (2006.01)
*F02B 39/16* (2006.01)
*F04D 17/10* (2006.01)
*F04D 29/46* (2006.01)

(52) U.S. Cl.
CPC .............. *F02B 39/16* (2013.01); *F04D 17/10* (2013.01); *F02B 2039/164* (2013.01); *F04D 29/462* (2013.01); *Y02T 10/12* (2013.01)

(56) References Cited

U.S. PATENT DOCUMENTS

| | | |
|---|---|---|
| 2012/0237343 A1 | 9/2012 | Matsuyama |
| 2013/0259661 A1 | 10/2013 | Shudo et al. |
| 2013/0302148 A1 | 11/2013 | Solanki et al. |
| 2014/0169949 A1 | 6/2014 | Tashiro et al. |
| 2014/0178181 A1 | 6/2014 | Tashiro et al. |
| 2016/0312651 A1 | 10/2016 | Boening et al. |
| 2017/0002672 A1 | 1/2017 | Shudo et al. |

FOREIGN PATENT DOCUMENTS

| | | |
|---|---|---|
| DE | 10 2013 225 642 A1 | 6/2015 |
| EP | 0 378 343 A1 | 7/1990 |
| EP | 2514945 A1 | 10/2012 |
| EP | 2 662 532 A2 | 11/2013 |
| EP | 3 080 399 B1 | 10/2016 |
| JP | 59-73537 U | 5/1984 |
| JP | 62-8334 U | 1/1987 |
| JP | 2-185623 | 7/1990 |
| JP | 7-189724 | 7/1995 |
| JP | 2003-227344 | 8/2003 |
| JP | 2010-96110 | 4/2010 |
| JP | 2013-72400 | 4/2013 |
| JP | 2013-124649 | 6/2013 |
| JP | 5206307 | 6/2013 |
| JP | 2013-231405 | 11/2013 |
| JP | 5409741 | 2/2014 |
| JP | 5579145 | 8/2014 |
| JP | 2015-14252 | 1/2015 |
| JP | 2015-127517 | 7/2015 |
| JP | 2016-20652 | 2/2016 |
| KR | 10-2012-0086743 | 8/2012 |
| WO | WO 2011/074039 A1 | 6/2011 |
| WO | WO 2012/081491 A1 | 6/2012 |
| WO | WO 2015/086205 A1 | 6/2015 |

OTHER PUBLICATIONS

Written Opinion dated Apr. 25, 2017 in PCT/JP2017/004919, filed on Feb. 10, 2017.
English translation of the International Preliminary Report on Patentability and Written Opinion of the International Searching Authority dated Oct. 4, 2018 in PCT/JP2017/004919 filed Feb. 10, 2017, 9 pages (Written Opinion previously filed).

* cited by examiner

TURBOCHARGER

CROSS REFERENCE TO RELATED APPLICATIONS

This application is a continuation application of International Application No. PCT/JP2017/0004919, filed on Feb. 10, 2017, which claims priority to Japanese Patent Application No. 2016-062106, filed on Mar. 25, 2016, the entire contents of which are incorporated by reference herein.

BACKGROUND ART

Technical Field

The present disclosure relates to a turbocharger in which a heat-shielding member is arranged on a back surface of an impeller.

Related Art

Hitherto, a turbocharger of a variable capacity type has been widely used. In such a turbocharger, for example, as disclosed in Patent Literature 1, a plurality of nozzle vanes are annularly arrayed in a flow passage for introducing exhaust gas from a turbine scroll flow passage to a turbine impeller. The nozzle vanes are mounted to shaft portions. When the shaft portions are rotated by power of an actuator, angles of the nozzle vanes are changed in the flow passage along with the rotation of the shaft portions. A flow passage width (so-called nozzle throat width) is changed so that a flow rate of the exhaust gas flowing through the flow passage is controlled.

Further, a heat-shielding member is arranged between a back surface of a turbine impeller and a bearing housing. The heat-shielding member is configured to suppress transfer of heat to the bearing housing side. The heat-shielding member is held in contact, on its outer side in a radial direction of a shaft, with a nozzle ring which axially supports shaft portions of nozzle vanes. The heat-shielding member is held in contact, on its inner side in the radial direction of the shaft, with the bearing housing.

CITATION LIST

Patent Literature

Patent Literature 1: Japanese Patent No. 5409741

SUMMARY

Technical Problem

With use of the heat-shielding member described above, transfer of heat from the turbine impeller side to the bearing housing is suppressed. However, in order to suppress degradation in performance of the bearing which axially supports the shaft, further improvement in heat transfer suppressing function is strongly desired.

An object of the present disclosure is to provide a turbocharger capable of improving the heat transfer suppressing function.

Solution to Problem

In order to solve the above-mentioned problem, according to one embodiment of the present disclosure, there is provided a turbocharger, including: an impeller; nozzle vanes provided on a radially outer side of the impeller; a nozzle ring to which the nozzle vanes are provided; a heat-shielding member including: an outer contact portion, which is arranged between a back surface of the impeller and a wall portion of a housing, and is brought into contact with the nozzle ring from a side opposite to the nozzle vanes; and an inner contact portion, which is at a position on a radially inner side of the impeller with respect to the outer contact portion, and is brought into contact with a wall portion of the housing from the impeller side; and a separation portion, which is formed on the wall portion of the housing, and is recessed toward a side of separating from the heat-shielding member with respect to a contact portion to be brought into contact with the inner contact portion of the heat-shielding member.

The turbocharger may further include a nozzle unit, which includes the nozzle vanes and the nozzle ring, and is separated from the housing in an axial direction.

The heat-shielding member may have a curved shape in which the outer contact portion is separated from the wall portion of the housing more than the inner contact portion.

At least a part of the heat-shielding member between the inner contact portion and the outer contact portion extends along the back surface of the impeller.

The heat-shielding member may have a bent portion formed between the inner contact portion and the outer contact portion.

Effects of Disclosure

According to the present disclosure, it is possible to improve the heat transfer suppressing function.

DESCRIPTION OF EMBODIMENT

Figure 1:
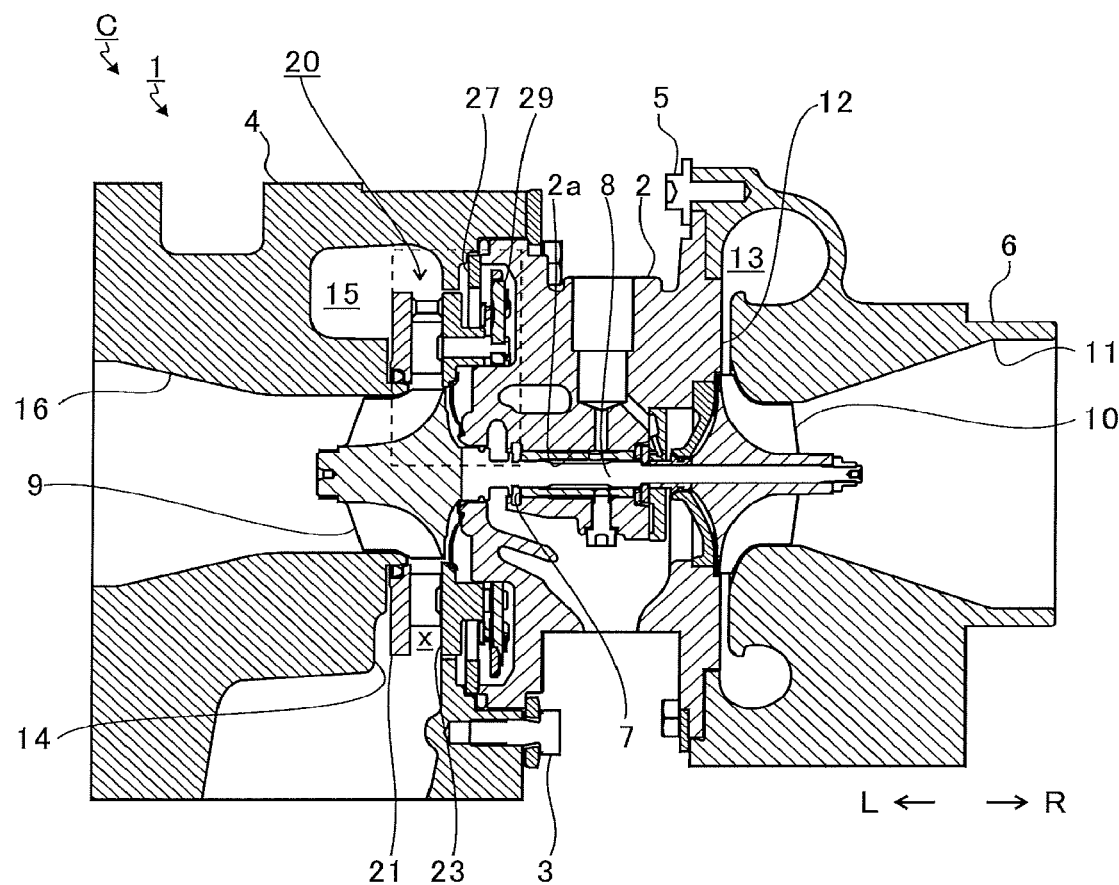
FIG. 1 is a schematic sectional view of a turbocharger.

Now, with reference to the attached drawings, an embodiment of the present disclosure is described in detail. The dimensions, materials, and other specific numerical values represented in the embodiment are merely examples used for facilitating understanding, and do not limit the present disclosure otherwise particularly noted. Elements having substantially the same functions and configurations herein and in the drawings are denoted by the same reference symbols to omit redundant description thereof. Further, illustration of elements with no direct relationship to the present disclosure is omitted.

FIG. 1 is a schematic sectional view of a turbocharger C. In the following description, the direction indicated by the arrow L illustrated in FIG. 1 corresponds to a left side of the turbocharger C. The direction indicated by the arrow R illustrated in FIG. 1 corresponds to a right side of the turbocharger C. As illustrated in FIG. 1, the turbocharger C includes a turbocharger main body 1. The turbocharger main body 1 includes a bearing housing 2 (housing). A turbine housing 4 (housing) is coupled to the left side of the bearing housing 2 by a fastening bolt 3. A compressor housing 6 is coupled to the right side of the bearing housing 2 by a fastening bolt 5. The bearing housing 2, the turbine housing 4, and the compressor housing 6 are integrated.

The bearing housing 2 has a receiving through hole 2a. The receiving through hole 2a penetrates through the turbocharger C in a right-and-left direction. A shaft 8 is axially supported so as to be rotatable by a radial bearing 7 which is received in the receiving through hole 2a (in this embodiment, a semi-floating bearing is illustrated in FIG. 1 as an example). A turbine impeller 9 (impeller) is provided to a left end portion of the shaft 8. The turbine impeller 9 is received in the turbine housing 4 so as to be rotatable. Further, a compressor impeller 10 is provided to a right end portion of the shaft 8. The compressor impeller 10 is received in the compressor housing 6 so as to be rotatable.

The compressor housing 6 has a suction port 11. The suction port 11 is opened on the right side of the turbocharger C. An air cleaner (not shown) is connected to the suction port 11. Further, under a state in which the bearing housing 2 and the compressor housing 6 are coupled to each other by the fastening bolt 5, a diffuser flow passage 12 is formed. The diffuser flow passage 12 is formed by opposed surfaces of the bearing housing 2 and the compressor housing 6. The diffuser flow passage 12 increases pressure of air. The diffuser flow passage 12 is annularly formed so as to extend from an inner side to an outer side in a radial direction of the shaft 8. The diffuser flow passage 12 communicates with the suction port 11 on the inner side in the radial direction of the shaft 8 through intermediation of the compressor impeller 10.

Further, the compressor housing 6 has a compressor scroll flow passage 13. The compressor scroll flow passage 13 has an annular shape. The compressor scroll flow passage 13 is positioned on the outer side in the radial direction of the shaft 8 with respect to the diffuser flow passage 12. The compressor scroll flow passage 13 communicates with a suction port of an engine (not shown). The compressor scroll flow passage 13 communicates also with the diffuser flow passage 12. Thus, when the compressor impeller 10 is rotated, air is sucked into the compressor housing 6 through the suction port 11. The sucked air is increased in pressure and speed during a course of flowing through blades of the compressor impeller 10. The air increased in speed and pressure is increased in pressure (pressure recovery) in the diffuser flow passage 12 and the compressor scroll flow passage 13. The air increased in pressure is introduced to the engine.

Further, under a state in which the bearing housing 2 and the turbine housing 4 are coupled to each other by the fastening bolt 3, a clearance 14 is formed between opposed surfaces of the bearing housing 2 and the turbine housing 4. The clearance 14 is a space in which a flow passage "x" is arranged. Nozzle vanes 24, which are described later, are arranged in the flow passage "x". The flow passage "x" allows exhaust gas to flow therethrough. The clearance 14 is annularly formed so as to extend from an inner side toward an outer side in the radial direction of the shaft 8 (turbine impeller 9).

Further, the turbine housing 4 has a discharge port 16. The discharge port 16 communicates with the turbine scroll flow passage 15 through the turbine impeller 9. The discharge port 16 faces a front side of the turbine impeller 9. The discharge port 16 is connected to an exhaust gas purification device (not shown).

The turbine scroll flow passage 15 communicates with a gas inflow port (not shown). Exhaust gas discharged from the engine is introduced to the gas inflow port. The turbine scroll flow passage 15 communicates also with the flow passage "x" described above. Thus, the exhaust gas introduced through the gas inflow port to the turbine scroll flow passage 15 is introduced to the discharge port 16 through the flow passage "x" and the turbine impeller 9. That is, the flow passage "x" is a passage which extends from the turbine scroll flow passage 15 to the turbine impeller 9. The exhaust gas causes the turbine impeller 9 to rotate during a course of flowing. Then, a rotational force of the turbine impeller 9 described above is transmitted to the compressor impeller 10 through the shaft 8. The air is increased in pressure by the rotational force of the compressor impeller 10, and is introduced to the suction port of the engine.

At this time, when the flow rate of the exhaust gas introduced to the turbine housing 4 changes, the rotation amounts of the turbine impeller 9 and the compressor impeller 10 change. In some cases, depending on an operating condition of the engine, the air increased in pressure to a desired pressure cannot sufficiently be introduced to the suction port of the engine. In view of the above-mentioned circumstance, a nozzle drive mechanism 20 (nozzle unit) is provided to the turbocharger C.

The nozzle drive mechanism 20 changes a flow passage width (nozzle throat width to be described later) of the flow passage "x" of the turbine housing 4. The nozzle drive mechanism 20 changes the flow speed of the exhaust gas introduced to the turbine impeller 9 in accordance with a flow rate of the exhaust gas. Specifically, when the rotation speed of the engine is low, and the flow rate of the exhaust gas is small, the nozzle drive mechanism 20 decreases a degree of opening of a nozzle of the flow passage "x" to increase the flow speed of the exhaust gas introduced to the turbine impeller 9. In this manner, the nozzle drive mechanism 20 can rotate the turbine impeller 9 even with a small flow rate. Now, description is made of a configuration of the nozzle drive mechanism 20.

Figure 2:
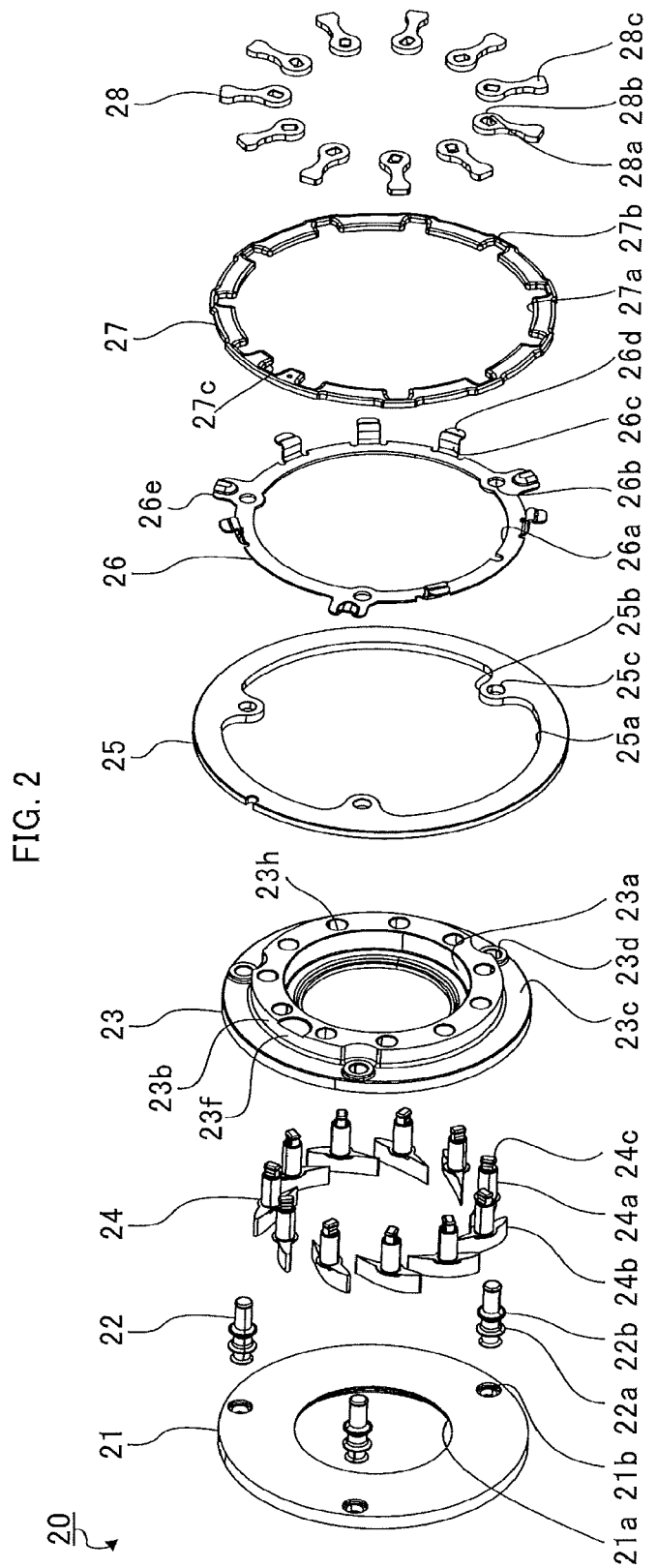
FIG. 2 is an exploded perspective view of a nozzle drive mechanism.

FIG. 2 is an exploded perspective view of the nozzle drive mechanism 20. As illustrated in FIG. 2, the nozzle drive mechanism 20 includes a plate 21. The plate 21 has a plate shaft hole 21a. The plate shaft hole 21a penetrates through the plate 21 in an axial direction of the shaft 8 (hereinafter simply referred to as "axial direction"). The plate 21 has, for example, a flat plate shape having a circular cross-sectional shape in a direction orthogonal to the axial direction of the shaft 8. On an outer peripheral surface side of the plate 21, there are formed plate pin holes 21b. The plate pin holes 21b penetrate through the plate 21 in the axial direction.

A plurality of (three in this embodiment) plate pin holes 21b are formed apart from each other in a circumferential direction of the plate 21. One ends of pins 22 are inserted through the plate pin holes 21b, respectively.

A nozzle ring 23 is provided on the compressor impeller 10 side (right side in FIG. 1) with respect to the plate 21. The nozzle ring 23 includes a main body portion 23b of an annular shape. The main body portion 23b has an insertion hole 23a. The insertion hole 23a penetrates through the main body portion 23b in the axial direction. The main body portion 23b has, on the plate 21 side thereof, a flange portion 23c of an annular shape. The flange portion 23c projects radially outward from the main body portion 23b. At portions of the flange portion 23c which are opposed to the plate pin holes 21b of the plate 21, there are formed ring pin holes 23d. The ring pin holes 23d penetrate through the flange portion 23c in the axial direction. The pins 22 are inserted into the ring pin holes 23d.

The pins 22 each have a first annular projection 22a. The first annular projection 22a projects in a radial direction. An outer diameter of the first annular projection 22a is larger than an inner diameter of the plate pin hole 21b. Therefore, when the pin 22 is inserted into the plate pin hole 21b, the first annular projection 22a is brought into abutment against a surface of the plate 21 which is opposed to the nozzle ring 23. In such a manner, insertion positions of the pins 22 with respect to the plate pin holes 21b are determined.

Similarly, the pins 22 each have a second annular projection 22b. The second annular projection 22b projects in the radial direction. The second annular projection 22b is provided on another end side with respect to the first annular projection 22a. An outer diameter of the second annular projection 22b is larger than an inner diameter of the ring pin hole 23d. Therefore, when the pin 22 is inserted into the ring pin hole 23d, the second annular projection 22b is brought into abutment against a surface of the nozzle ring 23 which is opposed to the plate 21. In such a manner, insertion positions of the pins 22 with respect to the ring pin holes 23d are determined.

In such a manner, an interval between the plate 21 and the nozzle ring 23 opposed to each other is defined by the pins 22. The above-mentioned flow passage "x" is defined by the clearance between the plate 21 and the nozzle ring 23 opposed to each other. The pins 22 define a length of the flow passage "x" in the axial direction.

Further, the main body portion 23b has shaft portion holes 23h (shaft holes). The shaft portion holes 23h penetrate through the main body portion 23b in the axial direction. A plurality of (eleven in this embodiment) shaft portion holes 23h are formed apart from each other in a circumferential direction of the main body portion 23b.

A plurality of (eleven in this embodiment) nozzle vanes 24 are provided apart from each other in the circumferential direction of the main body portion 23b (rotation direction of the turbine impeller 9), similarly to the shaft portion holes 23h. Blade bodies 24b are provided in the clearance between the plate 21 and the nozzle ring 23 (that is, in the flow passage "x"). Shaft portions 24a projecting from the blade bodies 24b toward the nozzle ring 23 side are inserted into the shaft portion holes 23h and axially supported (in a cantilever state). The nozzle vanes 24 are provided to (supported by) the nozzle ring 23. In the foregoing, description is made of the case in which the shaft portions 24a are axially supported by the nozzle ring 23. However, the shaft portions 24a may extend also toward the plate 21 side, and the plate 21 may have holes for axially supporting the shaft portions 24a.

A support ring 25 is an annular member. The support ring 25 has a support shaft hole 25a. The main body portion 23b of the nozzle ring 23 is provided in the support shaft hole 25a. On an inner peripheral surface of the support shaft hole 25a, there are formed projecting portions 25b protruding toward the radially inner side. A plurality of (three in this embodiment) projecting portions 25b are formed so as to correspond to the ring pin holes 23d. The projecting portions 25b each have a support pin hole 25c. The support pin holes 25c are formed at positions opposed to the ring pin holes 23d. The support pin holes 25c penetrate through the projecting portions 25b in the axial direction.

A drive ring support 26 is an annular member. The drive ring support 26 is provided at a position on a side opposite to the flange portion 23c of the nozzle ring 23 with respect to the support ring 25 (on a side opposite to the plate 21 with respect to the nozzle vanes 24). Similarly to the support ring 25, the drive ring support 26 has a drive support shaft hole 26a. The main body portion 23b of the nozzle ring 23 is inserted into the drive support shaft hole 26a from the left side in FIG. 2. Further, the drive ring support 26 has drive support pin holes 26b. The drive support pin holes 26b are formed at positions opposed to the support pin holes 25c. The drive support pin holes 26b penetrate through the drive ring support 26 in the axial direction.

On an outer periphery of the drive ring support 26, there are formed locking portions 26c. The locking portions 26c project in the axial direction from the right side in FIG. 2 (side of separating from the support ring 25). Bent portions 26d are formed at distal ends of the locking portions 26c. The bent portions 26d are bent radially outward with respect to the drive ring support 26. Further, on an outer periphery of the drive ring support 26, there are formed support projecting portions 26e. The support projecting portions 26e project radially outward. The support projecting portions 26e are arranged so that positions thereof in the circumferential direction are different from those of the locking portions 26c.

Figure 3:
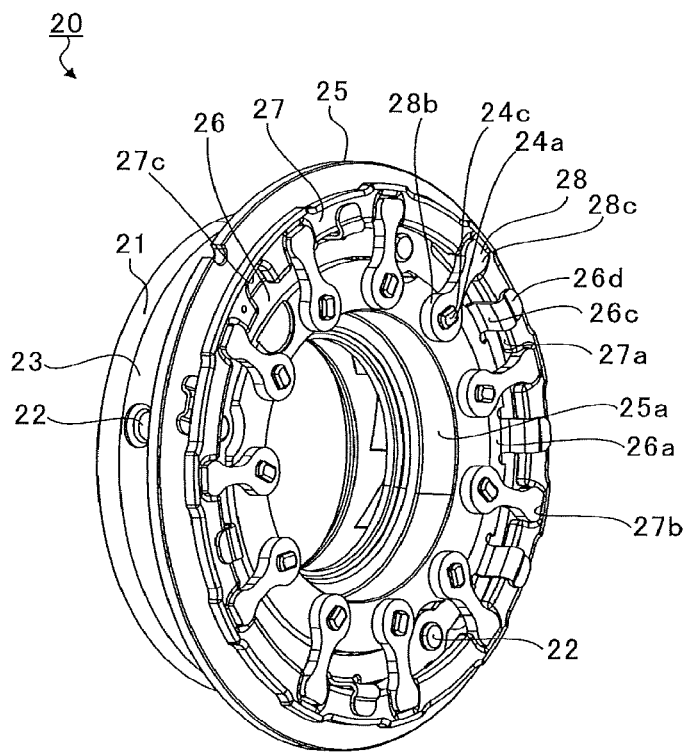
FIG. 3 is a perspective view of the nozzle drive mechanism after being assembled.

FIG. 3 is a perspective view of the nozzle drive mechanism 20 after being assembled. As illustrated in FIG. 3, the pins 22 are inserted into the plate pin holes 21b, the ring pin holes 23d, the support pin holes 25c, and the drive support pin holes 26b (see FIG. 2), and both ends of each pin 22 are caulked. In such a manner, the plate 21, the nozzle ring 23, the support ring 25, and the drive ring support 26 are assembled.

A drive ring 27 is an annular member. The drive ring 27 has a drive shaft hole 27a. The drive shaft hole 27a penetrates through the drive ring 27 in the axial direction. An inner diameter of the drive shaft hole 27a is larger than a diameter of the locking portion 26c of the drive ring support 26. Under the state in which the nozzle drive mechanism 20 is assembled, the locking portions 26c of the drive ring support 26 are located on an inner side of the drive shaft hole 27a. At this time, the bent portions 26d are on the right side in FIG. 2 with respect to the drive ring 27. The drive ring 27 is sandwiched between the bent portions 26d and the support projecting portions 26e. The drive ring 27 is supported by the locking portions 26c from the radially inner side.

Distal end portions 24c of the shaft portions 24a of the nozzle vanes 24 project from the shaft portion holes 23h of the nozzle ring 23. The distal end portions 24c of the shaft portions 24a are fitted to plate holes 28a of link plates 28, which are to be described later.

The number of the link plates 28 is equal to the number of the nozzle vanes 24. The plurality of link plates 28 have main bodies 28b, respectively. The main bodies 28b have plate holes 28a (see FIG. 2), respectively. The distal end portions 24c of the shaft portions 24a are inserted into the plate holes 28a, respectively. The nozzle ring 23 is arranged between the blade bodies 24b of the nozzle vanes 24 and the main bodies 28b of the link plate 28.

The main bodies 28b of the link plates 28 are arranged in the drive shaft hole 27a of the drive ring 27. The link plates 28 each have a link projection 28c. The link projection 28c projects radially outward from the main body 28b toward the inner peripheral surface of the drive shaft hole 27a.

Fitting grooves 27b are formed in an inner periphery of the drive shaft hole 27a of the drive ring 27. The fitting grooves 27b are recessed radially outward. The fitting grooves 27b are arranged apart in the circumferential direction of the drive shaft hole 27a, and the number of the fitting grooves 27b is equal to the number of the nozzle vanes 24. The link projections 28c are fitted to the fitting grooves 27b, respectively. In each of the link plates 28, the distal end portion 24c of the shaft portion 24a inserted into the plate hole 28a of the main body 28b is caulked. The link plate 28 and the shaft portion 24a rotate integrally with each other.

In the drive ring 27, one drive groove 27c is formed in the inner periphery of the drive shaft hole 27a. The drive groove 27c has approximately the same shape as that of the fitting groove 27b. The drive groove 27c is formed at a position different from those of the fitting grooves 27b in the circumferential direction. A drive link (not shown) is fitted to the drive groove 27c. The drive link has approximately the same shape as that of the link plate 28. Power of an actuator (not shown) is transmitted to the drive ring 27 through intermediation of the drive link. As a result, the drive ring 27 rotates (slides) while being supported by the locking portions 26c of the drive ring support 26.

When the drive ring 27 rotates, the link projections 28c fitted to the fitting grooves 27b are pressed by the drive ring 27 in the rotation direction. The link plates 28 rotate (rock) about axial centers of the shaft portions 24a, respectively. As a result, the shaft portions 24a fixed to the link plates 28 rotate. The blade bodies 24b of the plurality of nozzle vanes 24 synchronously rotate together with the shaft portions 24a. In such a manner, a flow passage width (so-called nozzle throat width) of the blade bodies 24b adjacent to one another in the flow passage "x" is changed. That is, a degree of opening of the nozzle vanes 24 is changed. A flow passage area of the flow passage "x" formed of the blade bodies 24b adjacent to one another, the plate 21, and the nozzle ring 23 is changed.

Figure 4:
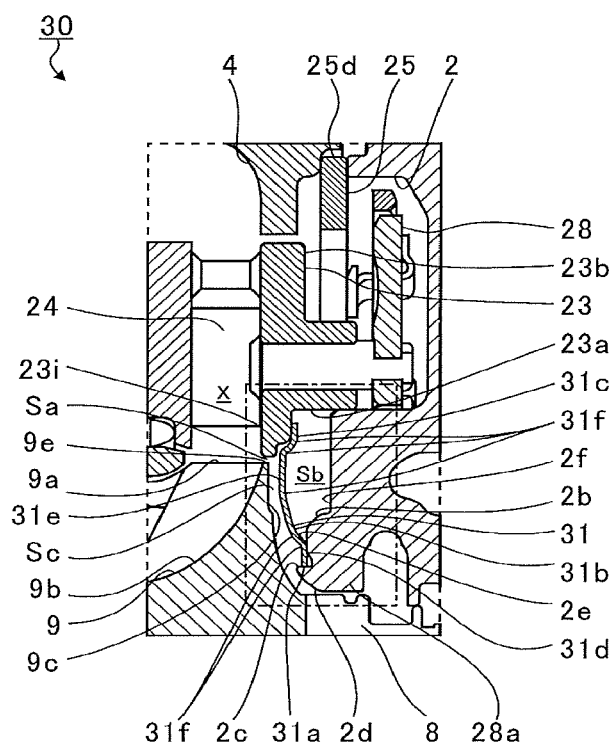
FIG. 4 is an explanatory view for illustrating a heat insulation structure of the turbocharger.

FIG. 4 is an explanatory view for illustrating a heat insulation structure 30 of the turbocharger C. In FIG. 4, illustration is given of the broken-line portion of FIG. 1. As illustrated in FIG. 4, an outer peripheral edge portion 25d of the support ring 25 is sandwiched between the bearing housing 2 and the turbine housing 4. In such a manner, the nozzle drive mechanism 20 is held inside the bearing housing 2 and the turbine housing 4.

The heat-shielding member 31 is formed of, for example, an elastic member like a plate spring. The turbine impeller 9 includes a plurality of blades 9a and an impeller main body 9b. The blades 9a are provided to the impeller main body 9b so as to stand thereon. The heat-shielding member 31 is arranged so as to be opposed to a back surface 9c of the impeller main body 9b on a side opposite to a discharge port 16 (see FIG. 1).

A wall portion 2b is formed on the bearing housing 2 on the back surface 9c side of the impeller main body 9b. The wall portion 2b has an annular projection 2c projecting toward the back surface 9c side. A housing hole 2d is opened in the annular projection 2c. The shaft 8 is inserted into the housing hole 2d.

The heat-shielding member 31 has a main body portion 31b of an annular shape. The main body portion 31b has a heat-shielding hole 31a. The annular projection 2c is inserted into the heat-shielding hole 31a. A part of the main body portion 31b is positioned between the back surface 9c of the turbine impeller 9 and the wall portion 2b of the bearing housing 2.

Further, on the left side in FIG. 4 (nozzle vane 24 side) of the inner peripheral surface of the insertion hole 23a of the nozzle ring 23, a shaft hole projection 23i is formed. The shaft hole projection 23i projects radially inward. The shaft hole projection 23i is positioned on the radially outer side with respect to the impeller main body 9b of the turbine impeller 9. A clearance Sa is defined between the shaft hole projection 23i and the impeller main body 9b.

An outer contact portion 31c is a part of the main body portion 31b on an outer side in the radial direction of the shaft 8. The outer contact portion 31c is brought into contact with the shaft hole projection 23i from the right side in FIG. 4 (from the link plate 28 side, or from a side opposite to the nozzle vanes 24). Further, an inner contact portion 31d is a part of the main body portion 31b on an inner side in the radial direction of the shaft 8 with respect to the outer contact portion 31c. The inner contact portion 31d is brought into contact with a contact portion 2e of the wall portion 2b from the left side in FIG. (turbine impeller 9 side). That is, the heat-shielding member 31 is arranged between the contact portion 2e of the wall portion 2b and the shaft hole projection 23i. The heat-shielding member 31 is held in a state of being compressed (deformed) by a predetermined amount as compared to its natural length so as to have a pressing force exerted in the axial direction of the shaft 8. The outer contact portion 31c is brought into abutment against the shaft hole projection 23i, and the inner contact portion 31d is brought into abutment against the contact portion 2e.

The outer contact portion 31c is pressed against the shaft hole projection 23i, and the inner contact portion 31d is pressed against the contact portion 2e of the wall portion 2b. The heat-shielding member 31 is capable of sealing exhaust gas passing through both of the contact portions. Further, the heat-shielding member 31 is capable of suppressing transfer of heat of the exhaust gas to the bearing housing 2 side.

Further, a separation portion 2f is formed on the wall portion 2b of the bearing housing 2. The separation portion 2f is recessed toward the right side in FIG. 4 with respect to the contact portion 2e. The separation portion 2f is separated from the heat-shielding member 31. A space Sb is defined between the separation portion 2f and the heat-shielding member 31.

When the separation portion 2f is formed as described above, the wall portion 2b is separated from the heat-shielding member 31 so that the space Sb is defined to be large. Therefore, a heat transfer suppressing function of suppressing transfer of heat of exhaust gas to the bearing housing 2 can be improved.

Moreover, for example, the outer contact portion 31c may be located more on the left side (turbine impeller 9 side in the axial direction) than the inner contact portion 31d as illustrated in FIG. 4. In this case, for example, the heat-shielding member 31 has such a curved shape that the outer contact portion 31c is separated from the wall portion 2b of the bearing housing 2 as compared to the inner contact portion 31d. Therefore, the space Sb is secured largely. The heat-shielding effect can be improved.

Further, a part 31e of the main body portion 31b of the heat-shielding member 31 at a position between the outer contact portion 31c and the inner contact portion 31d may be curved. The part 31e of the main body portion 31b may be curved, for example, so as to project toward the left side in FIG. 4 (turbine impeller 9 side) with respect to the outer contact portion 31c and the inner contact portion 31d. In this case, the space Sb becomes even larger. The heat-shielding effect can be improved.

Further, a portion of the main body portion 31b between the outer contact portion 31c and the inner contact portion 31d may extend, for example, along the back surface 9c of the turbine impeller 9. In order to prevent contact between the turbine impeller 9 and the heat-shielding member 31, it is required that a clearance Sc be formed between the turbine impeller 9 and the heat-shielding member 31. In the case in which the portion of the main body portion 31*b* extends along the back surface 9*c* of the turbine impeller 9, the clearance Sc can be set small within the range in which the heat-shielding member 31 and the turbine impeller 9 are not in contact with each other. Therefore, the exhaust gas which flows into the back surface 9*c* side through the clearances Sa and Sc from the flow passage "x" is suppressed. The loss can be suppressed.

Further, an outer shape of the impeller main body 9*b* of the turbine impeller 9 as seen from the right side in FIG. 4 (outer shape as seen from a front side of the back surface 9*c*) may be a circular shape (full disc). In this case, the clearance Sa between an opposing portion 9*e* of the impeller main body 9*b*, which is opposed to the shaft hole projection 23*i*, and the shaft hole projection 23*i* is approximately constant along the circumferential direction.

Further, the main body portion 31*b* of the heat-shielding member 31 may have, for example, a plurality of bent portions 31*f* formed between the inner contact portion 31*d* and the outer contact portion 31*c*. That is, the heat-shielding member 31 may be an elastic member having a plurality of elastic elements in combination. For example, when one bent portion is formed, it can be considered that the heat-shielding member 31 is formed of a combination of two elastic elements. Here, an elastic modulus of each elastic element forming the heat-shielding member 31 tends to be larger as inclination with respect to the up-and-down direction in FIG. 4 is larger (closer to be parallel to the axial direction). An elastic force generated in the heat-shielding member 31 can be set larger with respect to compressive deformation of the heat-shielding member 31 in the axial direction. Each of the elastic elements forming the heat-shielding member 31 is set smaller in elastic force generated along with the compressive deformation of the heat-shielding member 31 in the axial direction when the elastic element extends to the radially outer side, under the condition in which the inclination angle with respect to the up-and-down direction in FIG. 4 is the same and an end portion position on the radially inner side is the same. As described above, when the bent portions 31*f* are formed, and the heat-shielding member 31 is formed by a combination of the plurality of elastic elements, the elastic force (elastic modulus) generated along with the deformation of the heat-shielding member 31 in the axial direction can easily be set to a predetermined magnitude. The degree of freedom in design can be improved. In this embodiment, as illustrated in FIG. 4, five bent portions 31*f* (inflection points) are formed as an example.

When the heat-shielding member 31 is assembled to the turbocharger C, the heat-shielding member 31 is affected by dimensional errors of members of the nozzle drive mechanism 20, the bearing housing 2, and the turbine housing 4. Under the influence of the dimensional errors, the heat-shielding member 31 may vary in amount of deformation (amount of contraction from a natural length) in the axial direction within the tolerable range in terms of structure. Therefore, as the amount of deformation of the heat-shielding member 31 changes, the elastic force generated in the heat-shielding member 31 also changes. When the elastic force of the heat-shielding member 31 is excessively large, it may affect the operation of the nozzle vanes 24 of the nozzle drive mechanism 20 during the operation. When the elastic force of the heat-shielding member 31 is excessively small, it may affect the sealing performance for sealing of the outer contact portion 31*c* and shaft hole projection 23*i* and for sealing of the inner contact portion 31*d* and the contact portion 2*e* of the wall portion 2*b*. Therefore, it is required that the heat-shielding member 31 be designed so that the amount of variation in elastic force generated in the heat-shielding member 31 falls within a predetermined range.

In view of this, the elasticity characteristic of the heat-shielding member 31 may be set so that the elastic force to be generated linearly increases or decreases with respect to increase or decrease in amount of deformation in the axial direction within a predetermined range (has a linear relationship, or is approximately constant in elastic modulus). In this case, the elastic force generated with respect to a predetermined amount of deformation in the axial direction is set approximately constant. Thus, the elastic force generated by the heat-shielding member 31 during the operation can easily be suppressed within the predetermined range described above. It is not always required that the elastic force generated with respect to the increase or decrease in amount of deformation of the heat-shielding member 31 in the axial direction be in the linear relationship in a strict sense. For example, when the amount of deformation of the heat-shielding member 31 in the axial direction falls within a predetermined range, as long as the elastic force does not abruptly change with a certain amount of deformation, the elastic force to be generated may vary.

Figure 5:
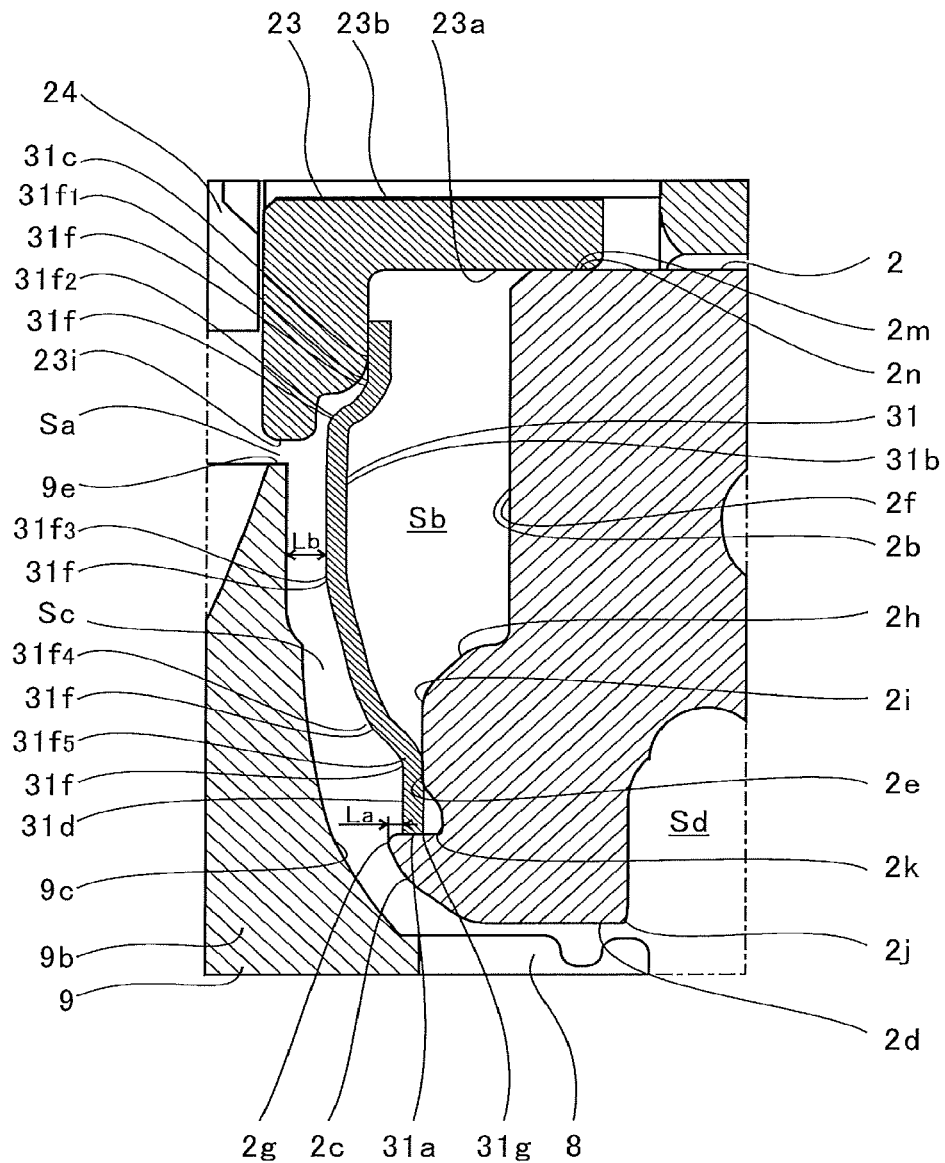
FIG. 5 is an extraction view of the one-dot chain line portion of FIG. 4.

FIG. 5 is an extraction view of the one-dot chain line portion of FIG. 4. As illustrated in FIG. 5, for example, the annular projection 2*c* may be fitted to the heat-shielding hole 31*a*. In this case, it is preferred that a distal end 2*g* of the annular projection 2*c* on the back surface 9*c* side (left side in FIG. 5) of the turbine impeller 9 project toward the back surface 9*c* side of the turbine impeller 9 with respect to the heat-shielding hole 31*a* of the heat-shielding member 31.

A separation distance (for example, in the axial direction) between the distal end 2*g* of the annular projection 2*c* and the heat-shielding hole 31*a* is a distance La. Further, a minimum distance in the axial direction between the back surface 9*c* of the turbine impeller 9 and the main body portion 31*b* of the heat-shielding member 31 is a distance Lb. In FIG. 5, there is illustrated an example of the minimum distance in the axial direction between the back surface 9*c* of the turbine impeller 9 and the main body portion 31*b* of the heat-shielding member 31. A position in a radial direction at which the distance in the axial direction between the back surface 9*c* of the turbine impeller 9 and the main body portion 31*b* of the heat-shielding member 31 is the smallest may be on the radially outer side or the radially inner side as compared to the position illustrated in FIG. 5.

In this case, the distance La may be larger than the distance Lb between the back surface 9*c* of the turbine impeller 9 and the main body portion 31*b* of the heat-shielding member 31. In other words, before assembly of the nozzle ring 23, when the heat-shielding member 31 is at a position of being held in abutment against the turbine impeller 9, the annular projection 2*c* may be fitted to the heat-shielding hole 31*a*.

In this case, before assembly of the nozzle ring 23, under the state in which the annular projection 2*c* is fitted to the heat-shielding hole 31*a* of the heat-shielding member 31, the heat-shielding member 31 is less liable to fall on the back surface 9*c* side of the turbine impeller 9. Other members can be assembled in a stable state of the heat-shielding member 31.

Further, a curved portion 2*h* is formed between the contact portion 2*e* and the separation portion 2*f* of the wall portion 2*b*. The curved portion 2*h* is curved in a direction of separating from the back surface 9c of the turbine impeller 9 more on the radially outer side. In FIG. 5, an example of the curved portion 2h is illustrated. However, the shape of a boundary portion 2i of the curved portion 2h with respect to the contact portion 2e may have an angle sharper than that of the shape illustrated in FIG. 5.

For example, the contact portion 2e may extend to the radially outer side with respect to the inner contact portion 31d of the heat-shielding member 31. In this case, the curved portion 2h is positioned on the radially outer side with respect to the inner contact portion 31d. The inner contact portion 31d is not held in contact with the boundary portion 2i. Therefore, partial deformation of the inner contact portion 31d due to the contact with the boundary portion 2i is avoided. The degradation in sealing performance due to the partial deformation of the inner contact portion 31d can be avoided.

Further, the curved portion 2h may be curved, for example, in a direction of projecting toward the space Sb side. For example, an end portion 2j of the housing hole 2d on a side opposite to the annular projection 2c is open to the space Sd in which lubricating oil scattered from the shaft 8 scatters. There is a case in which the space Sd is increased to improve the sealing performance for lubricating oil from the bearing housing 2 to the turbine impeller 9 side. Through formation of the curved portion 2h, a thickness of the wall portion 2b between the space Sb and the space Sd can be secured. Therefore, the space Sd can be increased, and the degree of freedom in design can be improved.

Further, an annular groove 2k may be formed in an outer periphery of a base end of the annular projection 2c of the wall portion 2b. For example, when the annular groove 2k is not formed, it is conceivable to form a curved surface (form a round shape) extending from the inner contact portion 31d to the base end of the annular projection 2c to suppress stress concentration at a connection portion between the inner contact portion 31d and the annular projection 2c. In this case, an end portion 31g of the heat-shielding hole 31a of the heat-shielding member 31 on the right side in FIG. 5 is brought into abutment against the curved surface and extends to the radially outer side (rides the curved surface).

Through formation of the annular groove 2k, for example, even when a curved surface is formed at the base end portion of the annular projection 2c, riding of the end portion 31g of the heat-shielding hole 31a can be avoided.

Further, in this case, for example, the bent portions 31f are referred to as "first bent portion $31f_1$", "second bent portion $31f_2$", "third bent portion $31f_3$", "fourth bent portion $31f_4$", and "fifth bent portion $31f_5$", from the radially outer side. In the example illustrated in FIG. 5, the third bent portion $31f_3$ is opposed to both of the back surface 9c of the turbine impeller 9 and the separation portion 2f in the axial direction.

In order to alleviate the centrifugal force generated during operation, there is a case in which the back surface 9c of the turbine impeller 9 is inclined in a direction of approaching the heat-shielding member 31 in the axial direction on the radially inner side. In this case, through formation of the third bent portions $31f_3$, the heat-shielding member 31 can easily be formed into a shape extending along the back surface 9c of the turbine impeller 9. The clearance Sc between the heat-shielding member 31 and the back surface 9c of the turbine impeller 9 can be set small. Leakage of the exhaust gas to the clearance Sc can be suppressed. Here, description has been made of an exemplary case in which one third bent portion $31f_3$ is formed between the second bent portion $31f_2$ and the fourth bent portion $31f_4$. However, a plurality of bent portions 31f may be formed between the second bent portion $31f_2$ and the fourth bent portion $31f_4$.

Further, for example, a fitting surface 2m may be formed on a radially outer side of the separation portion 2f of the wall portion 2b. The fitting surface 2m extends, for example, parallel to the axial direction. The fitting surface 2m extends in a circumferential direction of the insertion hole 23a of the nozzle ring 23. In other words, the wall portion 2b has a projection 2n of an annular shape having the fitting surface 2m as an outer peripheral surface. The projection 2n may be fitted to the insertion hole 23a of the nozzle ring 23. In this case, when the nozzle ring 23 or the like is to be assembled to the bearing housing 2, positioning in the radial direction can be performed more easily as compared to the case of positioning through intermediation of other members.

Further, for example, the second bent portion $31f_2$ is bent in a direction of separating from the turbine impeller 9 in the axial direction on the radially outer side. In this case, for example, the second bent portions $31f_2$ of the heat-shielding member 31 may be positioned on the radially outer side with respect to the opposing portion 9e of the turbine impeller 9 (end portion of the impeller main body 9b on the radially outer side). In this case, as compared to the case in which the second bent portion $31f_2$ is at the position of being opposed to the opposing portion 9e of the turbine impeller 9 in the axial direction or on the radially inner side with respect to the opposing portion 9e, the clearance Sc between the back surface 9c of the turbine impeller 9 and the heat-shielding member 31 can be set smaller. Leakage of the exhaust gas to the clearance Sc can be suppressed.

Further, for example, the second bent portion $31f_2$ of the heat-shielding member 31 may be positioned on the radially outer side with respect to the shaft hole projection 23i of the nozzle ring 23. In this case, for example, when the fluid loss is to be subjected to numerical analysis through computational fluid dynamics (CFD) or the like, the clearance Sc between the back surface 9c of the turbine impeller 9 and the heat-shielding member 31 can be simulated with an annular shape. Therefore, as compared to the case in which a position of the heat-shielding member 31 in a second radial direction is the same as that of the shaft hole projection 23i of the nozzle ring 23 or is on the radially inner side with respect to the shaft hole projection 23i, the fluid loss can be estimated easily with high accuracy.

Modification Example

Next, description is made of a nozzle drive mechanism in a modification example. In the modification example, unlike the above-mentioned embodiment, the support ring 25 and the drive ring support 26 are not provided to the nozzle drive mechanism of the modification example.

The pins 22 are inserted into the plate 21 and the nozzle ring 23. The plate 21 and the nozzle ring 23 are assembled by caulking both ends of each pin 22. Further, a cylindrical portion is formed in the main body portion 23b of the nozzle ring 23 on a side opposite to the plate 21. The cylindrical portion projects toward a side of separating from the plate 21. The drive ring 27 is assembled to the cylindrical portion so as to be rotatable. A guide pin is used to prevent removal of the drive ring 27. The nozzle vanes 24 are arranged in a clearance between the plate 21 and the nozzle ring 23 (flow passage "x"). The shaft portion 24a is axially supported in the shaft portion hole 23h of the nozzle ring 23. The link plates 28 are fixed to the distal end portions 24c of the shaft portions 24a.

The link plate 28 has an extension portion. The extension portion extends from the main body 28b to the radially outer side of the nozzle ring 23. At an end portion of the extension portion on a side opposite to the main body 28b, a locking portion is formed. The locking portion has, for example, a columnar shape. The locking portion projects toward the nozzle vane 24 side.

Further, the outer peripheral surface of the drive ring 27 has fitting grooves. The fitting grooves are recessed radially inward. The locking portions of the link plates 28 project into the fitting grooves of the drive ring 27.

Here, the outer peripheral surface of the drive ring 27 has a drive groove in addition to the fitting grooves. A drive link is fitted to the drive groove. Power of an actuator (not shown) is transmitted to the drive ring 27 through intermediation of the drive link. As a result, the drive ring 27 rotates (slides) while being supported by the cylindrical portion of the nozzle ring 23.

When the drive ring 27 rotates, the locking portions are pressed by the drive ring 27 in the rotation direction. The link plates 28 rotate (rock) about an axial center of the shaft portion 24a. With this, the shaft portions 24a fixed to the link plates 28 rotate. The plurality of nozzle vanes 24 synchronously rotate together with the shaft portions 24a. With this, the flow passage width of the flow passage "x" changes.

Figure 6:
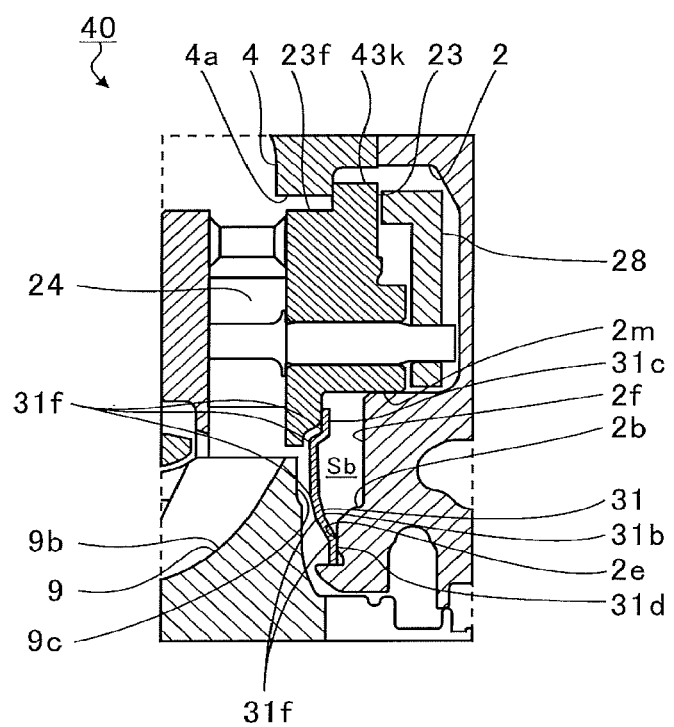
FIG. 6 is an explanatory view for illustrating a modification example.

FIG. 6 is an explanatory view for illustrating the modification example. FIG. 6 is an illustration of a cross section at a position corresponding to FIG. 4. As illustrated in FIG. 6, in a nozzle drive mechanism 40 (nozzle unit) in the modification example, similarly to the above-mentioned embodiment, the outer contact portion 31c of the heat-shielding member 31 is brought into contact with the shaft hole projection 23i of the nozzle ring 23 from the link plate 28 side. Moreover, the inner contact portion 31d of the heat-shielding member 31 is brought into contact with contact portion 2e of the wall portion 2b of the bearing housing 2 from the turbine impeller 9 side.

However, unlike the above-mentioned embodiment, for example, a projecting portion 43k is formed on an outer peripheral surface 23f of the nozzle ring 23. The projecting portion 43k projects radially outward from the main body portion 23b. The turbine housing 4 has a projecting wall portion 4a. The projecting wall portion 4a projects inward in the radial direction of the shaft 8. The projecting portion 43k is brought into abutment against the projecting wall portion 4a from the link plate 28 side (bearing housing 2 side).

Further, the nozzle drive mechanism 40 and the bearing housing 2 are separated in the axial direction. Specifically, the nozzle ring 23 is brought into abutment against the fitting surface 2m of the bearing housing 2 in the radial direction. The nozzle ring 23 is separated toward the turbine impeller 9 side in the axial direction. Similarly, the nozzle vanes 24 and the link plates 28 are separated from the bearing housing 2 on the turbine impeller 9 side in the axial direction. In other words, the bearing housing 2 does not have a surface that is held in abutment against the nozzle ring 23 from the turbine impeller 9 side in the axial direction.

The heat-shielding member 31 is arranged between the nozzle ring 23 and the bearing housing 2 under a state in which the heat-shielding member 31 is compressed from its natural length. The heat-shielding member 31 causes an elastic force to act from the outer contact portion 31c against the nozzle ring 23. The heat-shielding member 31 presses the nozzle ring 23 toward the plate 21 side.

The projecting portion 43k of the nozzle ring 23 is pressed by the heat-shielding member 31 against the projecting wall portion 4a of the turbine housing 4. In such a manner, the nozzle ring 23 is held at a position inside the bearing housing 2 and the turbine housing 4.

Also in the modification example, similarly to the above-mentioned embodiment, the separation portion 2f is formed on the wall portion 2b of the bearing housing 2. The space Sb is formed, thereby being capable of improving the heat transfer suppressing function of suppressing transfer of heat of the exhaust gas to the bearing housing 2.

The embodiment has been described above with reference to the attached drawings, but, needless to say, the present disclosure is not limited to the above-mentioned embodiment. It is apparent that those skilled in the art may arrive at various alternations and modifications within the scope of claims, and those examples are construed as naturally falling within the technical scope of the present disclosure.

For example, in the above-mentioned embodiment and modification example, description is made of the case in which the heat-shielding member 31 has a curved shape in which the outer contact portion 31c is separated from the wall portion 2b of the bearing housing 2 more than the inner contact portion 31d. However, the shape of the heat-shielding member 31 is not limited to this. For example, the inner contact portion 31d and the outer contact portion 31c of the heat-shielding member 31 may have an approximately equal separation distance from the wall portion 2b of the bearing housing 2. The inner contact portion 31d may be separated from the wall portion 2b of the bearing housing 2 more than the outer contact portion 31c. Further, for example, not limited to the curved shape, the heat-shielding member 31 may have a truncated cone shape.

Further, in the above-mentioned embodiment and modification example, description is made of the case in which a part of the heat-shielding member 31 between the inner contact portion 31d and the outer contact portion 31c extends along the back surface 9c of the turbine impeller 9. However, the shape of the heat-shielding member 31 is not limited to this. For example, it is not always required that a part of the heat-shielding member 31 between the inner contact portion 31d and the outer contact portion 31c extend along the shape of the back surface 9c of the turbine impeller 9.

Further, in the above-mentioned embodiment and modification example, description is made of the case in which the heat-shielding member 31 has the bent portions 31f between the inner contact portion 31d and the outer contact portion 31c. However, the configuration of the heat-shielding member 31 is not limited to this. For example, the heat-shielding member 31 may have no bent portion 31f.

Further, in the above-mentioned embodiment and modification example, description is made of the case in which the bent portions 31f are formed at five locations, as an example. However, the number of the bent portions 31f is not limited to five. For example, the bent portions 31f may be formed at three or four locations. The number of the bent portions 31f can suitably be set in accordance with predetermined operation conditions. Further, in the state of the natural length, the outer contact portion 31c and the inner contact portion 31d may be inclined rather than extending in the direction perpendicular to the axial direction. For example, before assembly of the nozzle ring 23, the outer contact portion 31c may be inclined in the direction of approaching the turbine impeller 9 in the axial direction on the radially outer side. Further, for example, before assembly of the nozzle ring 23, the inner contact portion 31d may be inclined in the direction of separating from the turbine impeller 9 in the axial direction on the radially inner side. In those cases, after assembly of the nozzle ring 23, the outer contact portion 31c and the inner contact portion 31d are brought into abutment against the shaft hole projection 23i and the contact portion 2e under a state in which the outer contact portion 31c and the inner contact portion 31d are compressed so as to be oriented in the direction of being approximately perpendicular to the axial direction.

Further, in the above-mentioned embodiment and modification example, description is made of the case in which the outer shape of the impeller main body 9b of the turbine impeller 9 as seen from the right side in FIG. 4 (outer shape as seen from a front side of the back surface 9c) is a circular shape (full disc). However, the shape of the impeller main body 9b is not limited to this. For example, a cutout portion (scallops) may be formed at a part between blades 9a adjacent to each other at the opposing portion 9e of the impeller main body 9b opposed to the shaft hole projection 23i. However, in the case of the full disc, as compared to the case in which the cutout portion is formed at a part between the blades 9a adjacent to each other, the clearance Sa between the shaft hole projection 23i and the impeller main body 9b can be set smaller. The inflow of the exhaust gas to the back surface 9c side is suppressed. The loss can be suppressed.

Further, in the above-mentioned embodiment and modification example, description is made of the case in which the turbocharger C is a variable capacity turbocharger. However, the above-mentioned configuration may be applied to a turbocharger to which a nozzle unit without a mechanism causing swinging of the nozzle vanes 24 is mounted.

INDUSTRIAL APPLICABILITY

The present disclosure is usable for a turbocharger in which a heat-shielding member is arranged on a back surface of an impeller.

What is claimed is:
1. A turbocharger, comprising:
an impeller;
nozzle vanes provided on a radially outer side of the impeller;
a nozzle ring to which the nozzle vanes are provided;
a heat-shielding member including:
an outer contact portion, which is arranged between a back surface of the impeller and a wall portion of a housing, and is brought into contact with the nozzle ring from a side opposite to the nozzle vanes; and
an inner contact portion, which is at a position on a radially inner side of the impeller with respect to the outer contact portion, and is brought into contact with the wall portion of the housing from an impeller side;
a separation portion, which is formed on the wall portion of the housing, and is recessed toward a side of separating from the heat-shielding member with respect to a contact portion to be brought into contact with the inner contact portion of the heat-shielding member;
an annular projection, which is formed on the wall portion of the housing, and projects toward a back surface side of the impeller; and
an annular groove formed on a surface of the housing from which the annular protrusion projects, the annular groove being formed in an outer periphery of a base end of the annular projection and adjacent the inner contact portion, the annular groove being recessed toward a direction separating from the back surface of the impeller.

2. The turbocharger according to claim 1, further comprising a nozzle unit, which includes the nozzle vanes and the nozzle ring, and is separated from the housing in an axial direction.

3. The turbocharger according to claim 2, wherein the heat-shielding member has a curved shape in which the outer contact portion is separated from the wall portion of the housing more than the inner contact portion.

4. The turbocharger according to claim 3, wherein at least a part of the heat-shielding member between the inner contact portion and the outer contact portion extends along the back surface of the impeller.

5. The turbocharger according to claim 3, wherein the heat-shielding member has a bent portion formed between the inner contact portion and the outer contact portion.

6. The turbocharger according to claim 2, wherein the heat-shielding member has a bent portion formed between the inner contact portion and the outer contact portion.

7. The turbocharger according to claim 1, wherein the heat-shielding member has a curved shape in which the outer contact portion is separated from the wall portion of the housing more than the inner contact portion.

8. The turbocharger according to claim 7, wherein at least a part of the heat-shielding member between the inner contact portion and the outer contact portion extends along the back surface of the impeller.

9. The turbocharger according to claim 7, wherein the heat-shielding member has a bent portion formed between the inner contact portion and the outer contact portion.

10. The turbocharger according to claim 1, wherein the heat-shielding member has a bent portion font led between the inner contact portion and the outer contact portion.

11. The turbocharger according to claim 1, wherein a free end of the inner contact portion is free of contact with the annular groove in an axial direction.

* * * * *